Aug. 11, 1936.　　　L. E. BARTON　　　2,050,599

ALTERNATING CURRENT POWER SUPPLY SYSTEM

Filed March 31, 1934　　2 Sheets-Sheet 1

INVENTOR:
Loy E. Barton
BY (signature)
ATTORNEY

Aug. 11, 1936.  L. E. BARTON  2,050,599
ALTERNATING CURRENT POWER SUPPLY SYSTEM
Filed March 31, 1934  2 Sheets-Sheet 2

INVENTOR:
Loy E. Barton
BY Goldsborough
ATTORNEY

Patented Aug. 11, 1936

2,050,599

UNITED STATES PATENT OFFICE 2,050,599

ALTERNATING CURRENT POWER SUPPLY SYSTEM

Loy E. Barton, Collingswood, N. J., assignor to Radio Corporation of America, a corporation of Delaware Application March 31, 1934, Serial No. 718,355

6 Claims. (Cl. 250—27)

This invention relates to alternating current power supply systems for radio apparatus and more particularly to a device which is adapted to neutralize the ripple components in such a power supply system.

When a polyphase alternating current power supply is provided for energizing the apparatus of a radio transmitter, every effort should be made to completely neutralize the effects in the output circuit of the ripple components existing in the filament supply and in the rectified plate supply. To do this effectively it is necessary to consider not only the fundamental frequency but also a number of the more important harmonics thereof.

Accordingly, it is among the objects of my invention to provide means for balancing out the ripple components in a rectified current power supply and filament heating system.

Another object of my invention is to provide a device in which a number of currents at respectively different frequencies, amplitudes, voltages and phase angles may be superimposed upon one another as required for neutralizing the hum effects in a rectified current source of power for radio apparatus.

Another object of my invention is to provide a hum eliminator for a polyphase power source in which the ripple components of a fundamental frequency and of its most objectionable harmonics are substantially removed from the rectified current.

In carrying out my invention I find that very satisfactory results can be obtained by the use of a number of different filtering units and frequency multipliers whereby the fundamental frequency together with some of its harmonics may in common be impressed upon a combining circuit so as to produce currents of desired amplitude, voltage and phase angle. The output of the combining circuit is then utilized to counterbalance the objectionable ripple components otherwise present in the rectified power supply and in the filament circuits of the radio apparatus.

The features of my invention which I consider to be novel are set forth in the appended claims. The invention itself, however, as to a preferred embodiment thereof and as to the details of construction and operation, may be best understood upon reading the following description in connection with the drawings, in which Figure 1 is a schematic diagram showing the circuit arrangements for combining a plurality of filtered currents at different frequencies into one current which may, for example, be utilized to impress a potential upon the input side of a radio transmitter along with the voice signals;

Figure 1:
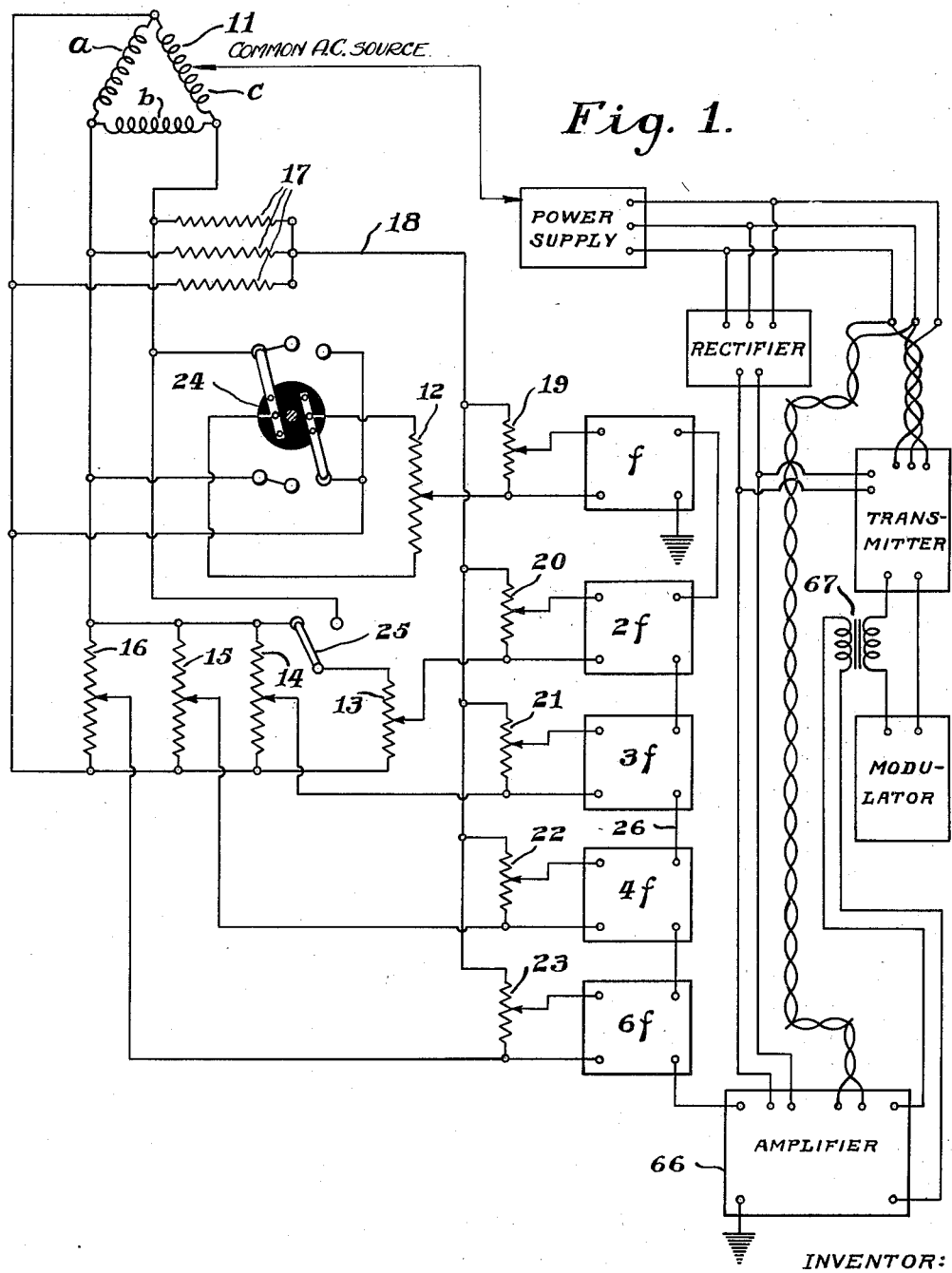

Referring to Fig. 1, I show, by way of illustration and more or less conventionally, what may be taken as the secondary windings 11 of a three-phase transformer in the main source of power supply. These secondary windings are delta-connected. Between the three legs $a$, $b$ and $c$ of this secondary, taps may be taken off which supply current to suitable potentiometers 12, 13, 14, 15 and 16. Across these taps is also disposed a star-connected set of resistances 17 to which a neutral conductor 18 may be connected. Along the conductor 18 I provide a plurality of taps leading to rheostats or volume control devices 19, 20, 21, 22 and 23. The other end of each rheostat is connected in circuit with one of the potentionmeters 12 to 16. Each of the volume control devices 19 to 23 is connected to its own filter system for either the fundamental frequency or one of the harmonic frequencies to be neutralized. These filter systems are represented by the block diagrams as $f$, $2f$, $3f$, $4f$ and $6f$ in Fig. 1. They are separately shown in greater detail in Figs. 3 to 6 inclusive, in connection with which they will presently be described.

To facilitate the phase adjustments of the several outputs from the different filter systems I employ in one instance a switching device 24 by which the potentiometer 12 may be connected across any one of the three legs of the transformer secondary 11. Thus, if it is desired to obtain a fundamental frequency component within one particular 120° arc, the potentiometer 12 may be connected across the two terminals of leg $a$ by setting the switch 24 in the position shown. If the desired phase angle is to be obtained from the potential across leg $b$, the switch would be set to its central position. Again, if the desired phase angle should be derived from leg $c$, then the switch 24 would be set to its extreme position when turning it clockwise.

When the frequency is doubled a 360° phase variation of the double-frequency in respect to the second harmonic which is to be neutralized can be derived from one or the other or two legs of the transformer 11. For this purpose the switch 25 is provided so that the potentiometer 14 may be connected across either of the legs a or c.

For the purpose of obtaining currents of suitable phase relation to the main source when the frequencies considered are either a third, fourth, or sixth harmonic of the fundamental frequency any desired phase angle may be obtained from one leg of the transformer as for example leg c. Accordingly, the potentiometers 14, 15 and 16 are so connected without going through any switching devices.

It will be seen from the above that my circuit arrangements are such as to provide a very flexible arrangement for obtaining through the potentiometers 12 to 16 inclusive currents having any desired phase relation to the ripple currents which are to be neutralized in the main supply source. My volume control devices 19 to 23 are also adapted to impress upon their respective filtering systems currents having suitable amplitude and voltage characteristics to serve for substantially neutralizing all objectionable hum effects in the power supply system.

Figure 2:
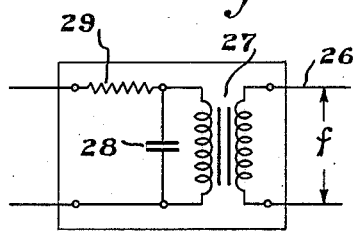
Fig. 2 is a more complete diagram of the filter system for the fundamental frequency.

In Fig. 2 I show a very simple filter system which serves its purpose in connection with the supply of a fundamental frequency component to be impressed upon what I may term my hum-bucking circuit 26. Essentially, this filter consists of a transformer 27, which preferably has an iron core, and across the primary of which I preferably introduce a tuning capacitor 28 which tunes the transformer to the fundamental frequency. The input circuit preferably includes also a suitable resistor 29. As is well known in the art, the values for the several units of the filter system shown in Fig. 2 may be so chosen as to discriminate in favor of the fundamental frequency.

Figure 3:
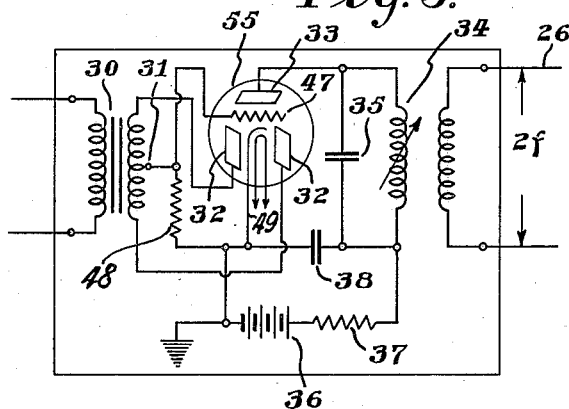
Fig. 3 is a circuit diagram showing the details of a frequency doubler and a filter system to be used in my invention.

Fig. 3 shows a frequency doubler and filter in which I preferably employ a transformer 30 having a mid-tap 31 on its secondary winding. If desired, a tube known as type 55 may be employed in which a portion thereof constitutes a triode having the customary cathode, grid and anode, and in which another portion of the tube includes two anodes cooperating with the unitary cathode. As shown in the diagram, I may connect the mid-tap 31 of the secondary of the transformer 30 to the triode grid 47. The two ends of the transformer secondary winding are connected respectively to the two anodes 32. A bias resistor 48 is provided between the grid 47 and the cathode 49. Due to the action of the transformer 30, the voltage appearing across this resistor is rich in the second harmonic. The anode 33 in the triode portion may be connected to an output circuit which includes the primary winding 34 of an adjustable transformer. Across this primary I preferably introduce a capacitor 35. A suitable potential is applied in the output circuit as by means of the battery 36. The output circuit also preferably includes a resistor 37. The capacitor 38 is preferably used as a by-pass condenser around the battery 36 and the resistor 37.

As can be readily seen by anyone skilled in the art, the diagram of Fig. 3 consitutes a frequency doubler and filter system the output from which may be impressed upon my hum-bucking circuit 26.

Figure 4:
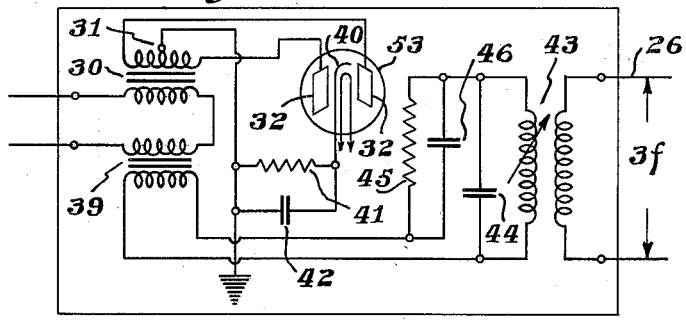
Figs. 4, 5 and 6 are similar diagrams showing the details of frequency multipliers and filters for obtaining compensating currents of the desired frequencies, amplitudes, voltages and phase angles for fulfilling the objects of my invention.

Fig. 4 shows how I may obtain the third harmonic of the fundamental frequency. The input circuit includes the primary windings of two transformers 30 and 39. The secondary winding of the transformer 30 has a midtap 31 and is otherwise similarly constituted to that of the transformer 30 shown in Fig. 3. In this instance, however, I prefer to use a full wave rectifier tube 53 having two anodes 32 and a cathode 40. The secondary winding of the transformer 30 may have its terminals connected respectively to the two anodes 32 whereas the mid-tap 31 may be grounded. The cathode 40 is connected in circuit with the mid-tap 31 through an impedance, preferably a resistor 41, across the terminals of which a by-pass condenser 42 may be inserted. The tube 53 serves as an energy absorbing device whereby the impedance in the primary of the transformer 30 may be so varied as to produce a current rich in harmonics, especially the third harmonic.

An optimum relation can be found between the impedance values of the two transformers 30 and 39 such that the circuit including the primary windings will carry the aforementioned current which is rich in harmonics. This will be better appreciated when it is seen that if the impedance of the transformer 30 is unduly high in relation to the impedance of the transformer 30 39 then whatever distortion there is in the circuit due to the action of the tube 53 will not be readily absorbed in the secondary winding of the transformer 39. On the other hand, if the impedance of the transformer 39 is unduly high in respect to that of the transformer 30 then there will be very little distortion in the primary windings of these two transformers and it will be difficult to derive the third harmonic which is wanted in the output circuit.

In order to discriminate against the fundamental frequency and harmonics other than the third harmonic I provide a filter system as shown in Fig. 4 including a transformer 43, the primary winding of which is tunable and is also made resonant by means of a capacitor 44, this resonant network is in circuit with the secondary winding of the transformer 39. Interposed therebetween I also find it advantageous to utilize a resistor 45 and a by-pass capacitor 46, these two units serving to effectively suppress the fundamental frequency and the second harmonic.

It will be seen from the foregoing that the apparatus comprehended diagrammatically in Fig. 4 serves effectively to produce a frequency of 180 cycles from a 60 cycle fundamental and that the attendant harmonics resulting from the operation of the system are effectively suppressed in the output across the terminals of the secondary winding of the transformer 43.

Figure 5:
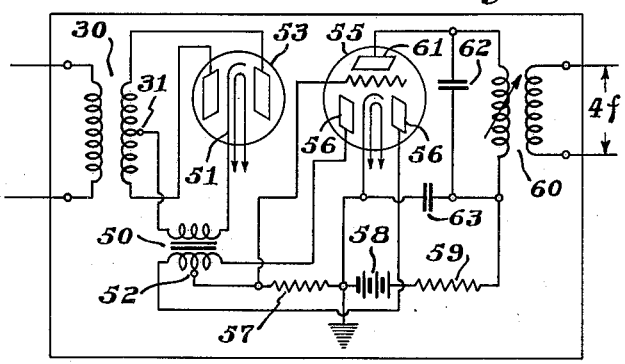

Referring now to Fig. 5, I show how the fourth harmonic of the fundamental frequency may be obtained. The input circuit includes the primary winding of the transformer 30. The secondary winding of this transformer has a midtap 31 and is otherwise similarly constituted to that of the transformer 30 shown in Fig. 3. In this instance, further, I utilize an electron tube 53 similarly constituted to the tube 53 shown in Fig. 4 and also similarly connected with the secondary winding of the transformer 30. One difference in the connections may be noted, however, and that is there is no ground connection between the mid-tap 31 on the secondary winding of the transformer 39 and the tube 53. Instead, I employ a transformer 50, the primary winding of which is included in the circuit between the mid-tap 31 and the cathode 51 of the tube 53. The secondary winding of the transformer 50 has a mid-tap 52 which is connected with the grid in the triode portion of an electron tube 55. The end terminals of the secondary winding of the transformer 50 are respectively connected to anodes 56 constituting a full wave rectifier portion of the tube 55. A suitable grid bias is provided by means of the resistor 57. The output circuit of the tube 55 includes a source of plate potential 58, a resistor 59, a primary winding of an adjustable transformer 60, and the anode 61 in the triode portion of the tube 55. The transformer 60 is preferably by-passed by means of the capacitor 62. The battery 58 and resistor 59 are also by-passed as by means of the capacitor 63.

In the operation of this network it will be seen that the fundamental frequency is twice doubled. The second harmonic is derived as a result of the full wave rectifying action of the tube 53 which causes impulses to be impressed upon the primary of the transformer 50 at twice the fundamental frequency. Full wave rectification again takes place in the tube 55 which causes four impulses per cycle of the fundamental frequency to be impressed upon the grid of this tube. The values assigned to the inductance of the primary winding of the transformer 60 and of the capacitor 62 are such that this network acts to discriminate in favor of the fourth harmonic and to suppress other harmonics. Thus the output in the secondary winding of the transformer 60 is that which is sought, namely the fourth harmonic.

Figure 6:
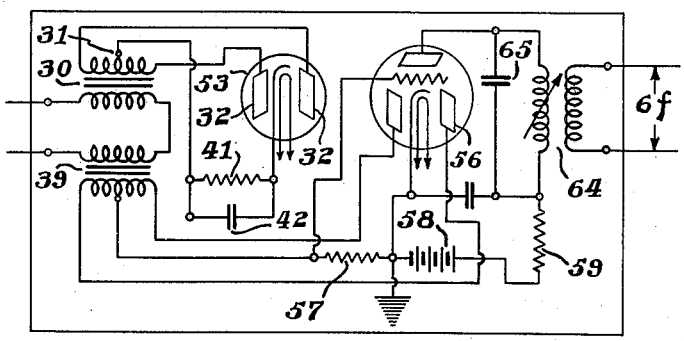

Referring now to Fig. 6, I show what is in effect a combination of the networks previously shown and described in reference to Figs. 3 and 4. It will be seen that in order to obtain the sixth harmonic I may first triple the fundamental frequency and the tripled frequency may then be doubled. For this purpose I may utilize a tube 53 in a network including the secondary of a transformer 30 having a mid-tap 31 the same as shown in Fig. 4. This provides distortion of the currents in the primaries of the two transformers 30 and 39 such that the currents are rich in harmonics including the third harmonic. The output from the secondary winding of the transformer 39 is then impressed upon the full wave rectifier electrodes of the tube 55. The result of this action is to impress impulses at six times the fundamental frequency upon the grid in the triode portion of the tube 55. In this case as distinguished from the network shown in Fig. 5 values will be chosen for the inductance of the transformer 64 and for the capacitor 65 such that these two elements will serve in combination to filter through the sixth harmonic and will also discriminate against other harmonics.

In the foregoing description of the several portions of my frequency multiplying and filtering system no mention has been made of the manner in which the several transformers 34, 43, 60 and 64 may be inductively adjusted. It will be understood, however, that these transformers may be so constituted that iron cores may be adjustably positioned within their coils. I have not, therefore, shown these transformers in the drawings as having iron cores since it is within the scope of my invention to utilize transformers either with or without iron as may be required.

Referring again to Fig. 1, the utilization circuit 26 may be seen interconnecting all of the frequency multipliers and the filter system for the fundamental frequency. This utilization circuit may be connected with an amplifier 66 the output energy from which is preferably impressed upon a transformer 67 in the modulation circuit. In this or any other suitable manner the output energy of the utilization circuit may be applied so as to compensate for the ripple components otherwise objectionably present in the output circuit of the transmitter.

The advantages to be derived from my improved system of balancing out the ripple components in an alternating current power supply system have proven to be very great. It has been found under actual tests that by using my invention in the manner heretofore described the carrier hum can be reduced to a value not more than 10% of its original value. The system has been successfully utilized in connection with a 5 k. w. transmitter and also in connection with a 50 k. w. transmitter. While it was contemplated that such a hum compensating device might be required to substantially eliminate other harmonics than the second, third, fourth and sixth, it was found in actual experience that the presence of the other harmonics in the power supply system was of such negligible proportions as to need no correction. It will be understood, however, that I do not intend to limit myself to the use of hum compensating devices of the character herein described as regards the particular harmonics to be neutralized.

Although I have disclosed herein certain specific means for accomplishing the objects of my invention, these are given merely by way of example and they are not to be construed as limitations to the scope of my invention. Various modifications will suggest themselves to those skilled in the art. My invention, therefore, is not to be limited excepting insofar as is necessitated by the prior art and by the scope of the appended claims.

I claim as my invention:

1. Apparatus for counteracting the component ripple effects in a radio device which is energized from a polyphase alternating current source, comprising circuit means including a plurality of adjustable potentiometers, each connectible across a desired leg of said source, for deriving a plurality of currents in suitable phase relation to one another, a volume control device in each circuit means, a plurality of tuned networks fed by said circuit means and means for combining the outputs of said tuned networks as a force having fundamental and harmonic frequency components opposed to like components in said ripple effects.

2. Apparatus for reducing the hum-effects of an alternating current power supply comprising an adjustable phase shifting device for the fundamental frequency of said supply, an adjustable phase shifting device for each of a plurality of harmonics of said fundamental frequency, a radio network energized by said power supply and subject to the hum-effects thereof, a tuned frequency multiplier connected with each of said phase shifting devices for the harmonics and means for applying the superposed output energy from said fundamental frequency phase shifting device and from said frequency multipliers as compensating input energy for said radio network whereby the hum effects to which it was subjected are substantially eliminated.

3. The method of counteracting the component ripple effects in a radio apparatus the energy for which is obtained from a polyphase alternating current source, comprising deriving from said source a fundamental frequency component of any required phase and amplitude, likewise deriving a plurality of harmonic frequency components, each of any required phase and amplitude, tunably filtering each of said components and applying the output energy thereof as a force each of the components of which is substantially equal and opposite to a corresponding component in said ripple effects.

4. An auxiliary device for an alternating current supply system serving to energize a radio transmitter, comprising a plurality of circuits each having therein an adjustable phase shifting device and an adjustable rheostat, a frequency multiplier in each but one of said circuits, means for deriving from said circuits a current the several frequency components of which are of such voltage, amplitude and phase relation to the ripple components in the energizing current directly supplied to said radio transmitter as to substantially neutralize the same.

5. A device in accordance with claim 4 in which said frequency multipliers are respectively tuned, to the second, third, fourth and at least one still higher harmonic of the fundamental frequency.

6. An auxiliary device for an alternating current supply system serving to energize a radio transmitter, comprising a plurality of circuits, one circuit appropriate to the fundamental frequency of said system and the other circuits each appropriate to a different harmonic of said fundamental frequency, means in said other circuits for selectively deriving and purifying said harmonics, means for adjusting to suitable values the voltages and amplitudes of the currents in said circuits, and means including an adjustable phase shifting device and a combining network for impressing upon said transmitter a current having suitable fundamental and harmonic frequency components for effectively neutralizing in the output circuit of said transmitter the effects of corresponding ripple components in the main energizing system.

LOY E. BARTON.